United States Patent
Wolfe et al.

(10) Patent No.: US 11,262,063 B2
(45) Date of Patent: Mar. 1, 2022

(54) HORTICULTURE LIGHT PANEL ASSEMBLY

(71) Applicant: MNR TECHNOLOGY, INC., Newfields, NH (US)

(72) Inventors: Christopher Wolfe, Newmarket, NH (US); Christopher Brown, Derry, NH (US); David Benschemer, Brentwood, NH (US); Mike Friedman, Pen Argyl, PA (US)

(73) Assignee: LIGHT SOURCE ENGINEERING LLC, Exeter, NH (US)

( * ) Notice: Subject to any disclaimer, the term of this patent is extended or adjusted under 35 U.S.C. 154(b) by 0 days.

(21) Appl. No.: 16/890,167

(22) Filed: Jun. 2, 2020

(65) Prior Publication Data

US 2020/0386396 A1    Dec. 10, 2020

Related U.S. Application Data

(60) Provisional application No. 62/857,472, filed on Jun. 5, 2019.

(51) Int. Cl.
| | |
|---|---|
| *F21V 29/76* | (2015.01) |
| *F21V 15/01* | (2006.01) |
| *A01G 7/04* | (2006.01) |
| *F21K 9/64* | (2016.01) |
| *F21Y 115/10* | (2016.01) |

(52) U.S. Cl.
CPC ............ *F21V 29/767* (2015.01); *A01G 7/045* (2013.01); *F21K 9/64* (2016.08); *F21V 15/013* (2013.01); *F21V 2200/20* (2015.01); *F21Y 2115/10* (2016.08)

(58) Field of Classification Search
CPC .................................................... A01G 7/045
See application file for complete search history.

(56) References Cited

U.S. PATENT DOCUMENTS

| | | |
|---|---|---|
| 7,828,465 B2 | 11/2010 | Roberge et al. |
| 7,910,022 B2 | 3/2011 | Agrawal et al. |
| 8,096,671 B1 | 1/2012 | Cronk et al. |
| 8,338,800 B2 | 12/2012 | Bortz et al. |
| 8,415,642 B2 | 4/2013 | Kingsley et al. |
| RE44,254 E | 6/2013 | Agrawal et al. |
| 8,519,359 B2 | 8/2013 | Kingsley et al. |
| 8,664,624 B2 | 3/2014 | Kingsley et al. |
| 8,833,974 B2 | 9/2014 | Agrawal et al. |
| 8,974,087 B2 | 3/2015 | Moeck et al. |
| 9,057,021 B2 | 6/2015 | Kingsley et al. |

(Continued)

OTHER PUBLICATIONS

Rivera, "10 Mistakes to Avoid When Using LED Growing Lights", https://www.maximumyield.com/reg/grow-smarter-technology-advances-in-agriculture/17392?utm_source=website&utm_medium=textlinks, Aug. 21, 2017.

(Continued)

*Primary Examiner* — William J Carter
(74) *Attorney, Agent, or Firm* — KPIP Law, PLLC; Kimberly A. Peaslee (57) ABSTRACT

A system and method for a light panel assembly which is particularly useful for commercial horticultural applications. An extruded heat sink frame provides for a layered light panel assembly with superior heat dissipation characteristics and low power requirements while providing highly efficient returns and output radiant flux.

15 Claims, 9 Drawing Sheets

(56) References Cited

U.S. PATENT DOCUMENTS

| | | | |
|---|---|---|---|
| 9,127,818 B2 | 9/2015 | Maxik et al. | |
| 9,184,350 B2 | 11/2015 | Mastin et al. | |
| 9,316,377 B2 | 4/2016 | Agrawal et al. | |
| 9,557,016 B2 | 1/2017 | Van Bommel et al. | |
| 9,622,424 B2 | 4/2017 | Martin | |
| 9,763,526 B2 | 9/2017 | Thomas et al. | |
| 9,797,573 B2 | 10/2017 | Horner et al. | |
| 10,101,003 B2 | 10/2018 | Horner et al. | |
| 2010/0080615 A1 | 4/2010 | Kikuchi | |
| 2010/0265708 A1 | 10/2010 | Lin et al. | |
| 2011/0013402 A1 | 1/2011 | Little, Jr. | |
| 2012/0113672 A1* | 5/2012 | Dubrow | G02B 6/0053 362/602 |
| 2012/0176765 A1* | 7/2012 | Uchida | A01M 29/10 362/2 |
| 2013/0033894 A1* | 2/2013 | Kleo | B32B 17/10541 362/602 |
| 2013/0047503 A1 | 2/2013 | Aikala et al. | |
| 2013/0088853 A1 | 4/2013 | Kingsley et al. | |
| 2013/0182412 A1* | 7/2013 | Choi | G02F 1/133615 362/97.1 |
| 2014/0041572 A1 | 2/2014 | Schuler et al. | |
| 2014/0061504 A1 | 3/2014 | Kingsley et al. | |
| 2014/0268635 A1 | 9/2014 | Aikala et al. | |
| 2015/0092410 A1 | 4/2015 | Boyer et al. | |
| 2015/0216233 A1 | 8/2015 | Sears et al. | |
| 2016/0187855 A1 | 6/2016 | Cincotta et al. | |
| 2018/0203180 A1 | 7/2018 | Horner et al. | |

OTHER PUBLICATIONS

PlatinumLED, P450, at least as early as Mar. 26, 2019.

Grow, "How to Flower Cannabis Plants with LED Grow Lights", TheWeedBlog, Oct. 28, 2012.

Ilumitex, HarvestEdge, "The New Standard in Linear LED Top Light", at least as early as Mar. 26, 2019.

High PPFD Cultivation Guide, Fluence Bioengineering, pp. 1-17, at least as early as Dec. 3, 2018.

Fluence Bioengineering, Inc., "Horticulture Lighting Metrics", Nov. 19, 2018.

Haze, "How Does Color Spectrum Affect Growing Marijuana Plants?", GowWeedEasy, pp. 1-30, at least as early as Nov. 19, 2018.

Zhang, "How LEDs are Making Weed Better", Wired, pp. 1-9, Oct. 15, 2015.

Lightpolymers, "Light Output (PPF) vs. Light Delivered (PPFD)", Light Management Through Chemistry, at least as early as Dec. 3, 2018.

"Make the Most of Your LED's: 5 Tips for Cannabis LED Growing", Royal Queen Seeds, pp. 1-11, Jun. 30, 2016.

Pro Series E, Smart Horticultural Lighting, at least as early as 2017.

Bergman, "Best Growing Lights for Indoor Marijuana Growing", The Best Marijuana Grow Lights, pp. 1-26, at least as early as Aug. 28, 2015.

Osram, "ZELION HL High-Output LED Replacement for 1000W Watts HPS", www.osram-americas.com/zelionhl, at least as early as Jan. 2018.

* cited by examiner

HORTICULTURE LIGHT PANEL ASSEMBLY

CROSS-REFERENCE TO RELATED APPLICATIONS

This application claims the benefit of U.S. Provisional Patent Application 62/857,472, filed Jun. 5, 2019, the content of which is incorporated by reference herein in its entirety.

FIELD OF THE DISCLOSURE

The present disclosure relates to lighting fixtures and more particularly to a light panel assembly useful for horticultural applications that has a lower operating temperature, low input power, high output luminous flux, and a broad distribution of optimal light as compared to conventional fixtures.

BACKGROUND OF THE DISCLOSURE

Many conventional horticultural lighting systems contain several hundreds, if not thousands, of light emitting diodes (LEDs) packed in a tight arrangement to provide for adequate light output for commercial growing systems. These systems must also provide additional cooling systems to deal with excess heat given off from these systems when in operation. Some of the conventional units include fans. In many cases, the conventional systems have a variety of LEDs, ranging from infrared to ultraviolet, including white, red and blue LEDs. These systems use direct lighting from the LEDs and as such are spread across the total surface of the unit and utilize various LED types in order to obtain the desired spectrum(s) for the various stages in growth of the particular crop. Because the systems use direct lighting from the LEDs the power is also inconsistent depending on the desired spectrum in use.

Many of the prior systems have a lit surface area of about 200 square inches, or less. Some of the units have high input power (e.g., 700 W) and others have a more modest input power (e.g., 300 W+). Others suggest they are "600 W" but are actually referring to an equivalent brightness of traditional incandescent lights. Still, in some systems a portion of the power is dedicated to fans used to dissipate the excess heat generated by the system during operation. In other cases, elaborate systems for heat removal add bulk and expense to the units in order to overcome the heat from the numerous light sources and high input power. In some studies these conventional fixtures raise the ambient temperature by about 15 to 35 degrees F. and are hot to the touch. Not only does heat from the unit increase risk of injury, it also reduces the life of the system. In many cases, these conventional systems also produce a relatively small surface area of optimal light despite having higher input power and more light sources.

Wherefore it is an object of the present disclosure to overcome the above-mentioned shortcomings and drawbacks associated with the conventional lighting systems, particularly those used in the commercial horticultural setting.

SUMMARY OF THE DISCLOSURE

One aspect of the present disclosure is a light panel assembly, comprising: an extruded frame comprising a first pair of rails and a second pair of rails, each of the rails comprising a plurality of layers having a plurality of fins arranged along each of the plurality of layers to dissipate heat produced during operation of the light panel assembly; a top cover configured to accept at least one power source with associated input and output junction boxes and also to provide a dust barrier; a rear back layer configured to provide water ingress protection into the assembly; a light guide layer configured to disperse radiation emitted by a plurality of light sources; a light conversion film layer configured to receive incident radiation from the plurality of light sources at a first wavelength and convert the incident radiation to an output radiation at a the required spectrum of wavelengths; and a diffuser layer configured to diffuse the output radiation; wherein the plurality of light sources are arranged along the length of at least one pair of rails and the light conversion film layer is removable from the light panel assembly after installation.

One embodiment of the light panel assembly is wherein the extruded frame comprises aluminum.

In another embodiment of the light panel assembly the extruded frame further comprises a channel machined in at least one rail to provide for removal of the light conversion film layer.

In certain embodiments, the extruded frame further comprises recesses for accepting fasteners for the light panel assembly. In some cases, the extruded frame further comprises contours at particular spacing and having particular dimensions to accommodate each of the layers in the light panel assembly.

Yet another embodiment of the light panel assembly is wherein the plurality of light sources is LEDs at about 450 nm. In some cases, the light conversion film is laminated to the diffuser layer. In another embodiment, the light conversion film is laminated to an acrylic layer other than the light guide. In still yet another embodiment, the light panel assembly further comprises a foam gasket layer and a polyester layer. In some cases, the ambient temperature of the unit during operation is less than 60° C. In some cases, the light panel assembly is installed in a growing area at a spacing to create a grid of about four feet by about eight feet.

These aspects of the disclosure are not meant to be exclusive and other features, aspects, and advantages of the present disclosure will be readily apparent to those of ordinary skill in the art when read in conjunction with the following description, appended claims, and accompanying drawings

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
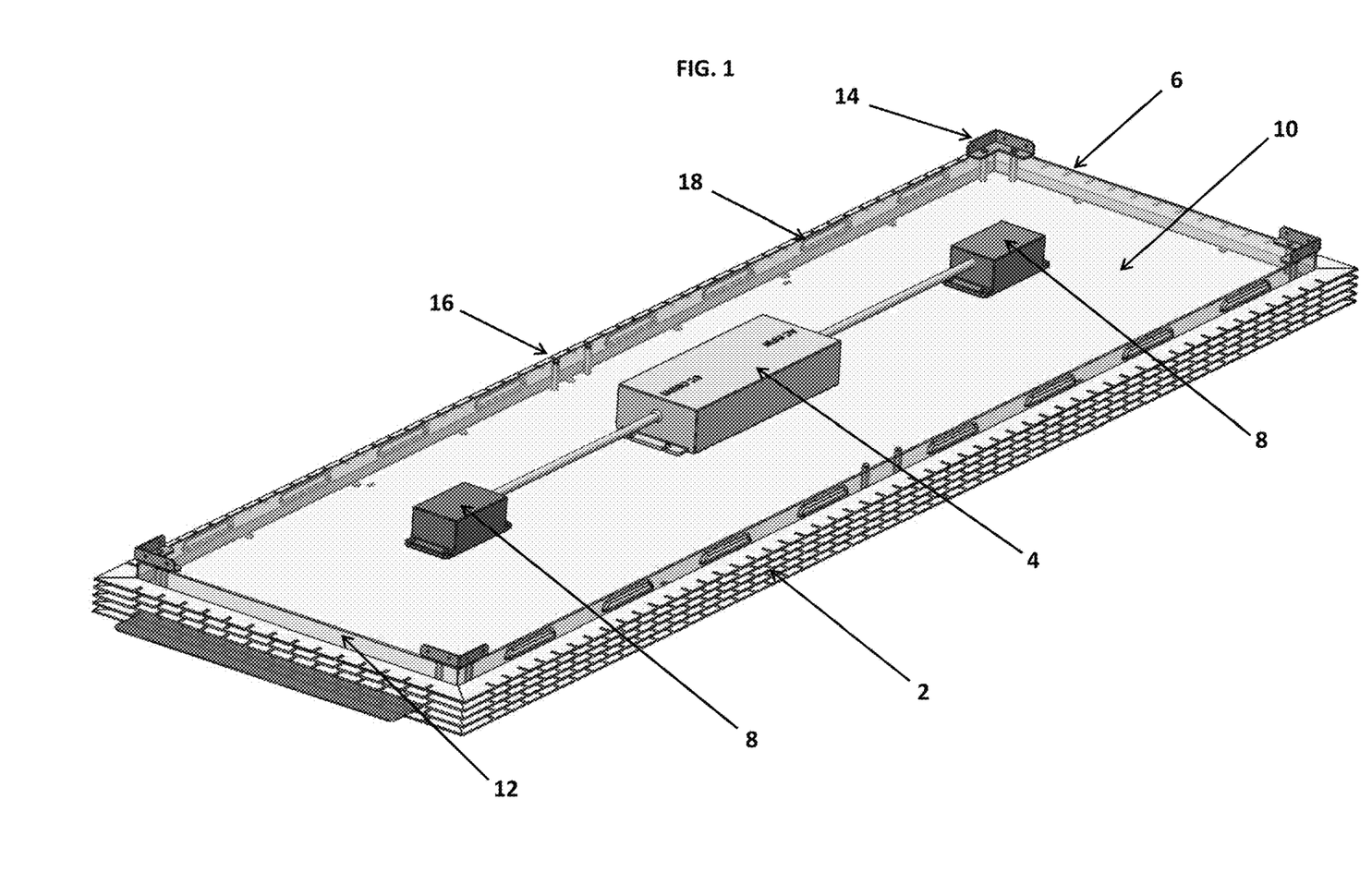
FIG. 1 shows a top perspective view of one embodiment of the light panel assembly of the present disclosure.

Referring to FIG. 1, a top perspective view of one embodiment of the system of the present disclosure is shown. More specifically, in one embodiment of the light panel assembly of the present disclosure, a heatsink/extrusion "picture frame" 2 supports a light guide assembly with one or more LED PCB modules. In one embodiment, there is a removable top cover 6 having four sides 12 fastened to the remainder of the light panel assembly. In some cases, the sides are fastened together with "L" brackets 14. In some cases, the sides 12 are further fastened to the light panel assembly with screws 16. In certain embodiments there are vented portions 18 in some or all of the sides. The multi-layered light panel assembly will be discussed in more detail, below.

Still referring to FIG. 1, one embodiment of the light panel assembly uses one dedicated power supply 4 supporting one or more LED PCB modules and AC/DC junction boxes 8, all of which are mounted to a top cover 6. In certain embodiments, the amount of input electrical power may change as a result of the amount of Flux (W) achievable with a particular power input. In one example, an optimal amount of Flux (~115 W) is possible with only ~272 W of input electrical power. In certain embodiments, additional LEDs may be used with an adjustable potentiometer to increase or decrease the amount of Flux created. In some embodiments, the LCD PCB modules are about 0.25"×24" in size. In one embodiment, there are thirty-four LEDs per module and four modules per light panel assembly. In some embodiments there are two modules per light panel assembly.

In some embodiments, the LEDs are wired in series groupings to reduce current requirements, and the groupings are then wired in parallel. To prevent a single LED burnout from creating a darkened area in the lighting panel, the groupings can be interleaved to distribute the failure over the surface.

In certain embodiments of the light panel assembly of the present disclosure, the LEDs are blue in color, and more specifically may be 450 nm wavelength LEDs. This LED provides high radiant flux light output of 1.4 W and it has a high efficiency of 69%. This higher output and efficiency means that fewer LEDs per light panel assembly are required and less of the input electrical power is wasted in the form of heat. In contrast, conventional systems are about 40% efficiency and so about 60% is in the form of heat. This coupled to a higher input power in conventional systems of 300 W+ input power makes for an inferior system.

In certain embodiments of the system of the present disclosure, there is about 570 in$^2$ of luminous surface. Passive cooling uses less power and the use of mono-color LEDs provides for a consistent power level. In certain embodiments, only the edge of the unit is lit so that heat is more evenly distributed on the module and provides for more efficient cooling with less heat sink mass. In certain embodiments, the use of conversion film and a diffuser ensure that the lighted area of the panel is evenly lit and a single color covers the entire luminous area, rather than the variations caused by conventional direct lit systems. The spectrum for the system of the present disclosure is modified by changing the conversion film. In one embodiment, a conversion film receives a 450 nm wavelength and converts it to a wide band of wavelengths in the range of about 600 nm to about 700 nm. In some cases, the conversion film is a phosphor film excited by a single color (e.g. 450 nm) and emits a predetermined spectrum of light (e.g., 600-700 nm) with high efficiency.

Figure 2:
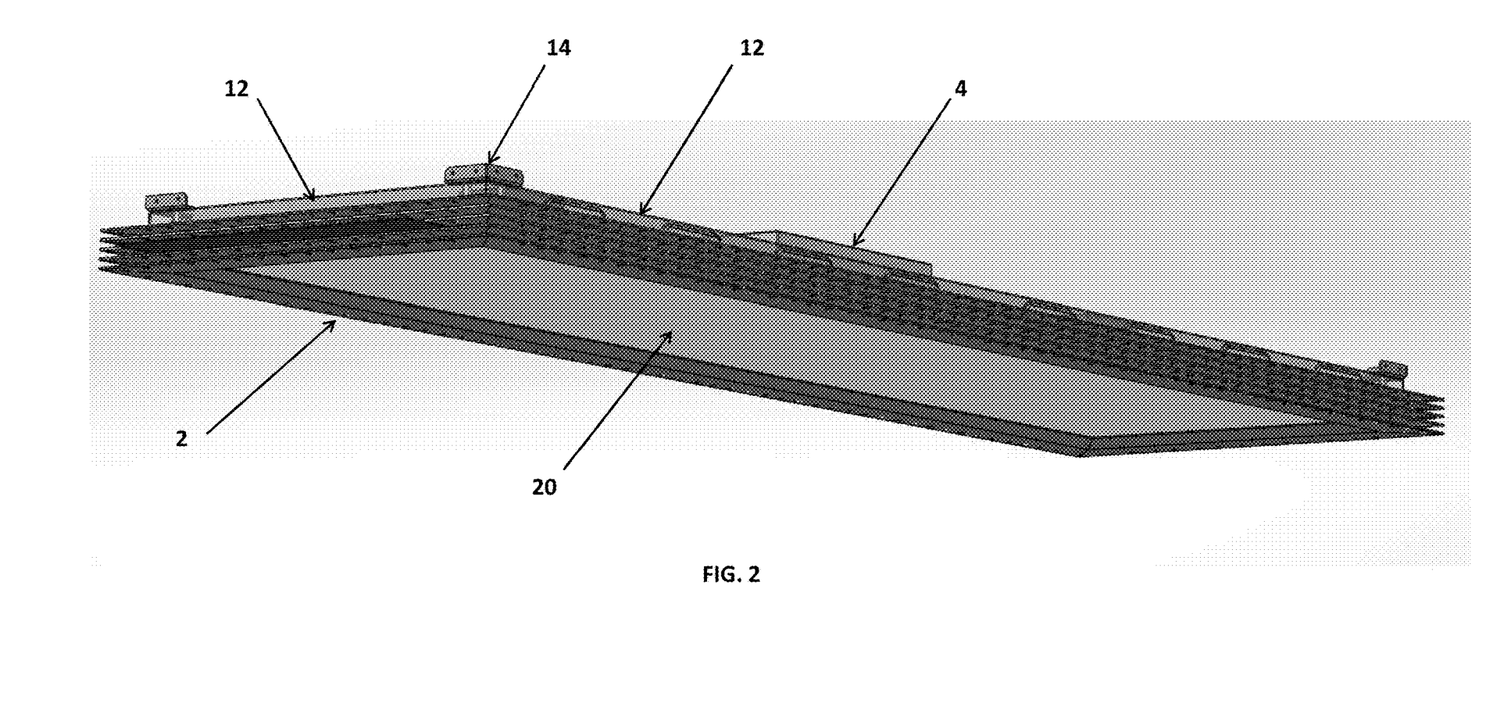
FIG. 2 shows a bottom perspective view of one embodiment of the light panel assembly of the present disclosure.

Referring to FIG. 2, a bottom perspective view of one embodiment of the light panel assembly of the present disclosure is shown. More specifically, in one embodiment the luminous area 20 is about 4'×1' and the overall size of the light panel assembly unit is about 55" long×about 17" wide×about 2.5" tall. The illuminated area is approx. 4.2 sq. ft. In certain embodiments, the extruded "picture frame" heat sink 2 has a multitude of fins arranged along the length of a multitude of layers (also fin-like) to aid in the dissipation of heat.

Figure 3:
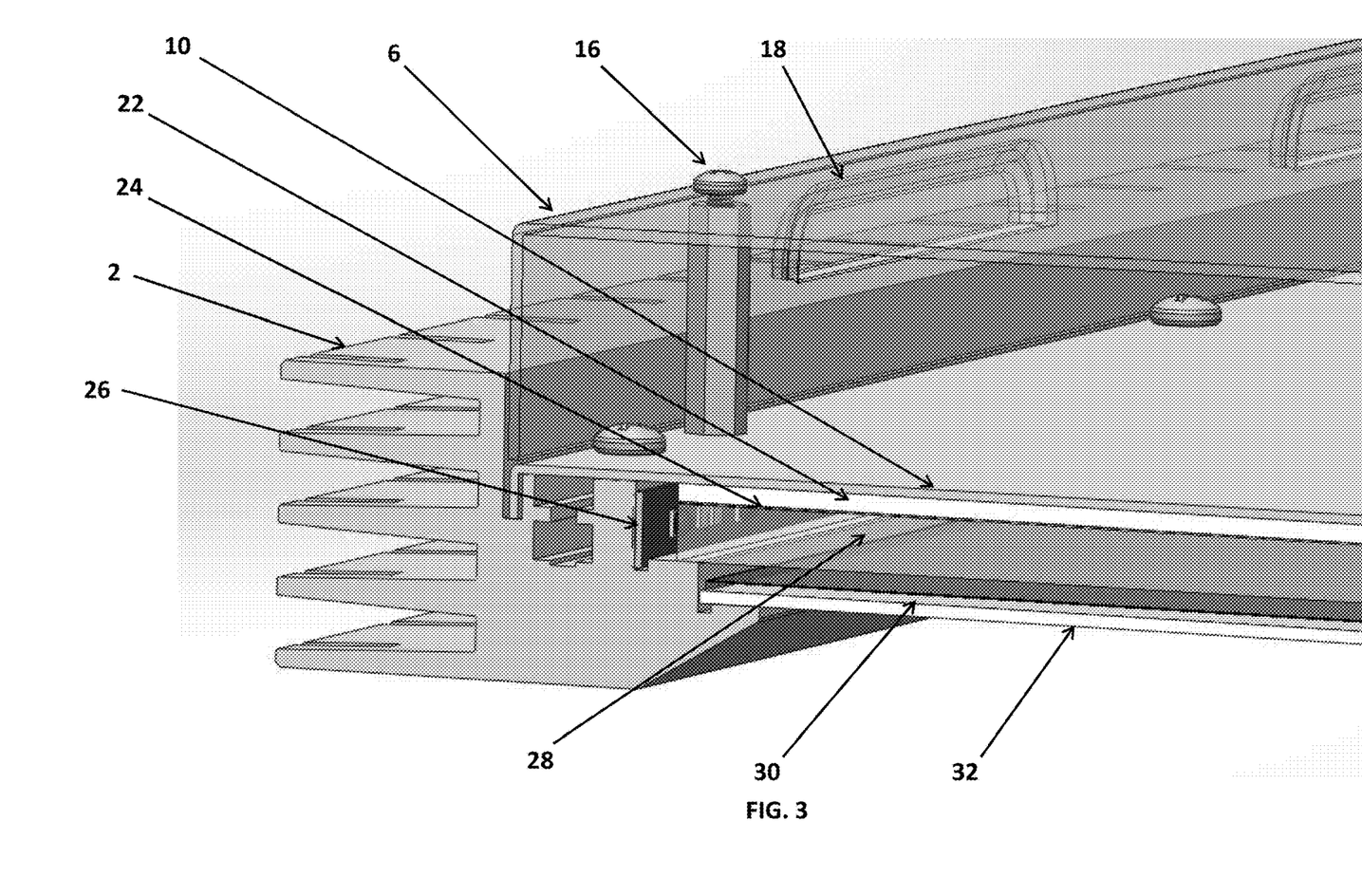
FIG. 3 shows a detailed view of a cutaway of one short side of one embodiment of the light panel assembly of the present disclosure.

Referring to FIG. 3, a detailed view of a cutaway of one short side of one embodiment of the light panel assembly of the present disclosure is shown. More particularly, a top cover 6 is shown fastened 16 to the light panel assembly. In some cases, opposing sides of the light panel assembly contain vents 18. In some cases, all sides or no sides contain vents. It depends on the particular application. In one embodiment, a backer panel 10 is adjacent to a foam gasket 22. The purpose of the foam (gasket) is to help secure a light guide (e.g., acrylic) assembly once the rear backer is fastened with screws. Any similar compressible material to foam can be used in its place. In certain embodiments, a polyester laminate 24 is adhered to the top surface of the light guide 28. The purpose of the polyester laminate is to act as a "reflector" and project the incoming light coming from the light guide edges. In one embodiment, the light guide 28 is laser etched acrylic, where the laser etch pattern reflects the light down through the phosphor conversion film 30 and a diffuser 32 to the plants. That pattern is optimized to provide an even distribution of light across the light panel assembly. In some cases, the color of the polyester laminate is typically white to better reflect the light. In some cases, the polyester laminate helps to evenly distribute the light down through the light panel assembly.

Still referring to FIG. 3, a heat sink/extrusion "picture frame" 2 is used to hold each of the multiple layers that comprise the light panel assembly at a particular spacing, as well as to dissipate heat from the unit during operation. Dissipation of heat is due, in part, to the multi-layer/multi-fin arrangement of the frame itself as well as providing for circulation between the various layers. In one embodiment, an LED PCB module 26 is used. In one embodiment, four LED PCBs are installed against a vertical wall within the inside geometry of the extrusion frame in line and parallel with the edges of the light guide along both long sides. In one embodiment, there are multiple individual power supplies mounted to the top of the rear backer panel. In other embodiments, there is just one power supply for the plurality of LED PCB modules.

In one embodiment of the light panel assembly of the present disclosure, a light guide 28 is used. There is a removable conversion film 30 as well as a diffuser 32 in certain embodiments of the light panel assembly. In one embodiment, from the bottom up, the first layer is the diffuser 32 followed by the removable conversion film layer 30. Then, an acrylic light guide 28 has the LED PCBs 26 situated on either side of the light guide in the same layer as the light guide itself. Next, a polyester laminate 24, which is adhered to the top surface of the light guide, is present. A foam gasket 22 and the rear backer panel 10 complete the light panel internal parts of the assembly. A top cover 6 is mounted above the rear backer and one or more power supplies and associated junction boxes are mounted to it (as shown in FIG. 1). In certain embodiments, the conversion film may be separate or laminated to the diffuser.

Figure 4:
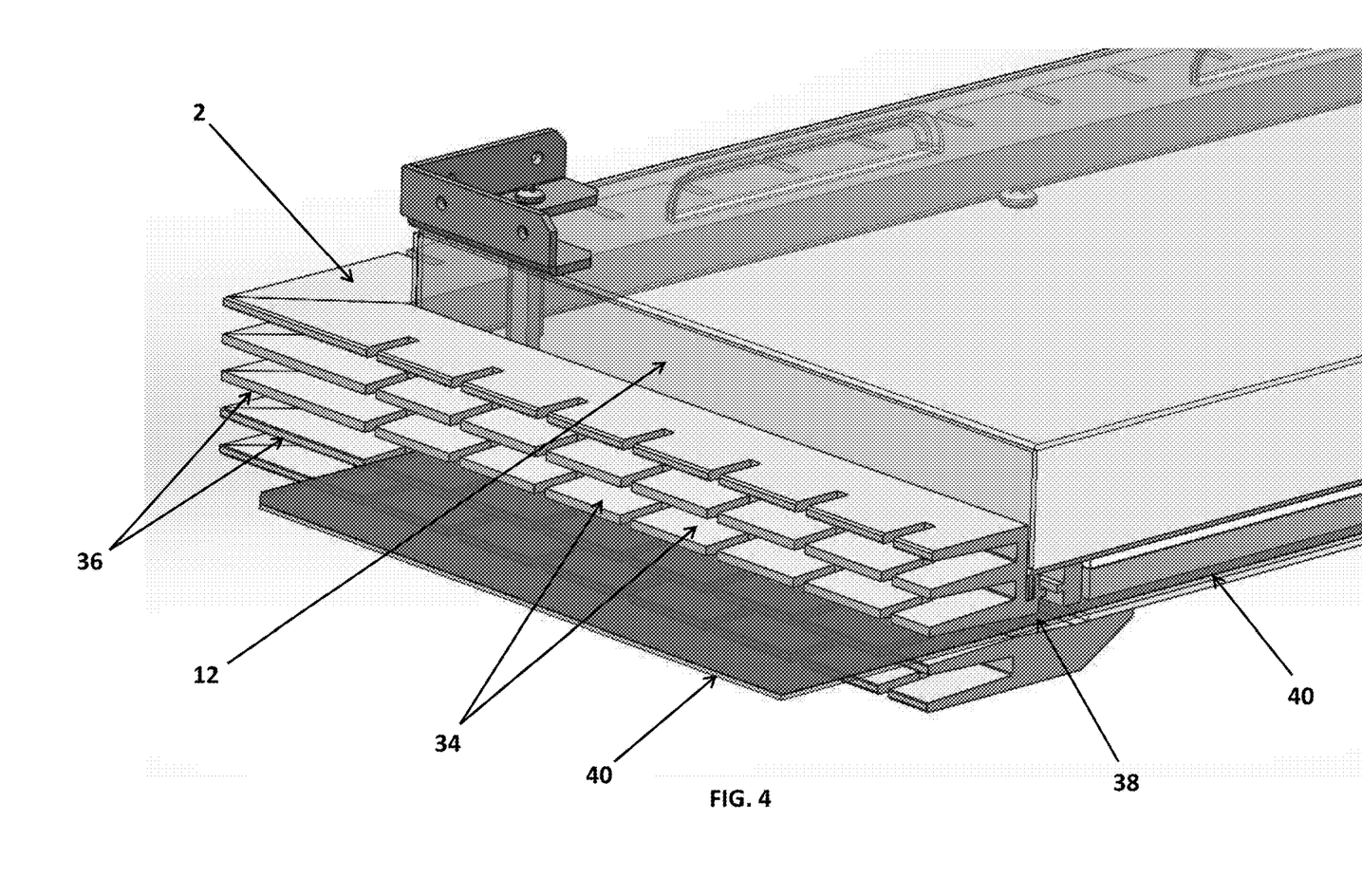
FIG. 4 shows a detailed view of a cutaway of one long side of one embodiment of the light panel assembly of the present disclosure.

Referring to FIG. 4, a detailed view of a cutaway of one long side of one embodiment of the light panel assembly of the present disclosure is shown. More specifically, the extruded/heat sink "picture frame" 2 comprises multiple fins 34 distributed along multiple layers 36 (also act as "fins"). In this embodiment, there are five layers 36. The fins allow the extruded structural frame to perform as a "heatsink" to passively dissipate the heat from the LED PCBs. In some cases, the sides 12 and or top cover of the light panel assembly are translucent. In other cases, the top cover is made from aluminum. The edges of the light guide are translucent as the entire light guide is made from transparent acrylic. The light panel assembly is designed to meet IP65 (dust tight rating and water jet protection) because of the top cover. The IP65 rating provides protection in the wet and humid environments of growing operations. An RTV sealant is used in grooves in the frame to achieve IP65. Another embodiment is IP66 rated, or higher, and uses additional sealing gaskets and RTV to seal the assembly to ensure IP66 rating (powerful water jets). The power supply along with its associated junction boxes is IP66 rated and is sealed and mounted on the outside of the top cover of the light panel assembly.

Figure 7A:
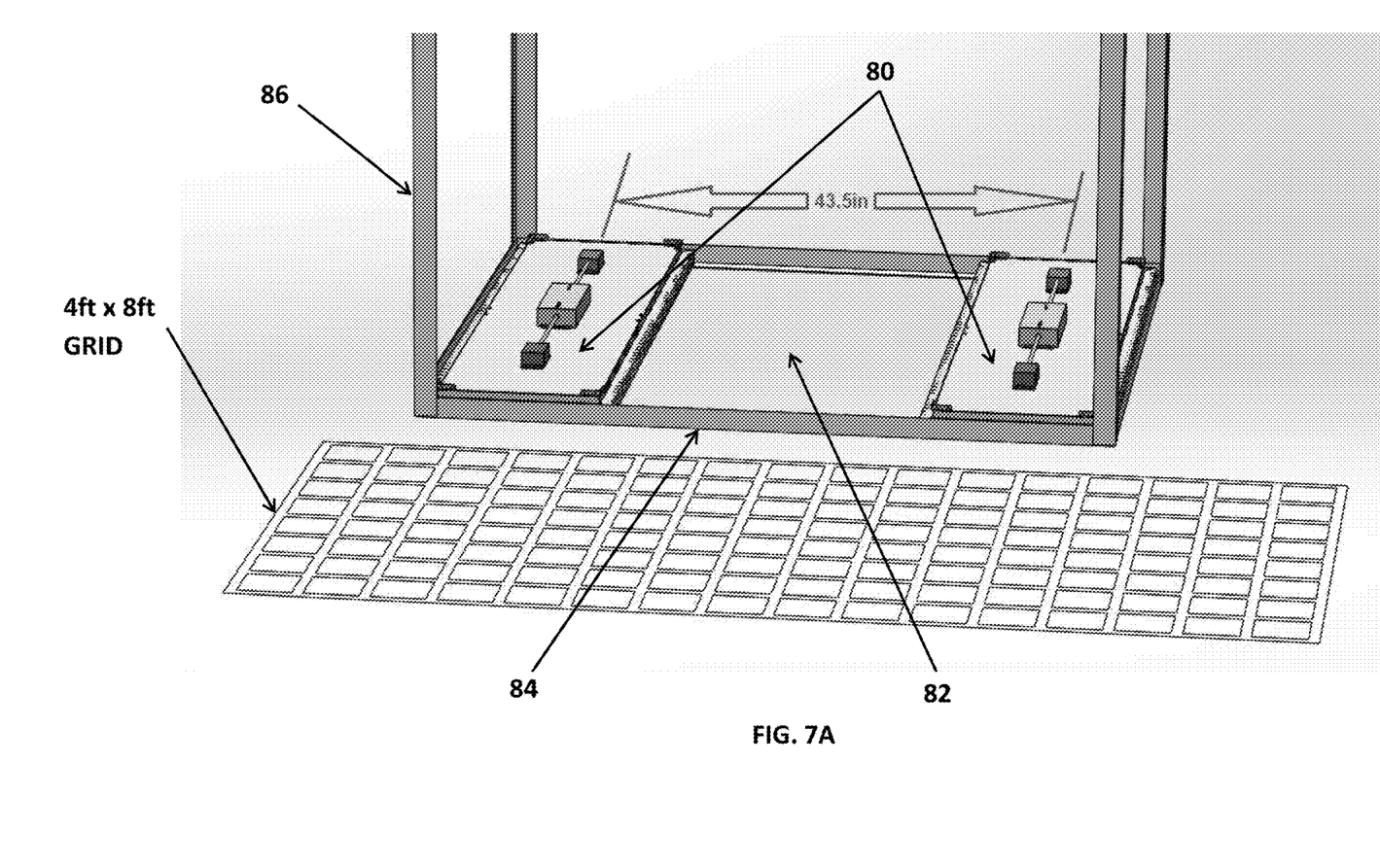
FIG. 7A shows one embodiment of the system with two light panel assemblies assembled together for use in a particular application.

In one embodiment of the light panel assembly of the present disclosure, the conversion film 40 is removable via an opening 38 in one side of the extruded frame. In one embodiment, the opening for the removal of the conversion film is intended to be through the front (e.g., a short length extrusion) as opposed to through the side (e.g., a long length extrusion). In certain embodiments, all of the rails have the same profile (cross section) but the front short rail has a horizontal "slot" machined into the extrusion to provide access to insert and remove the conversion film panel. The reason to have the conversion film on the front (e.g., a short side) is because when you line several panels up (as shown in FIG. 7A) it would be difficult to slide the conversion film in between the light panels.

It is understood that there are different wavelengths of light required for each grow step. The light panel assembly of the present disclosure provides for the ability to remove the conversion film thus allowing the grower to change the light panel assembly's wavelength throughout the growth cycle. Others may choose to move the plants to lights with alternate wavelengths during the grow cycle versus change the films, but this design gives the grower that option.

Figures 5A, 5B, 5C:
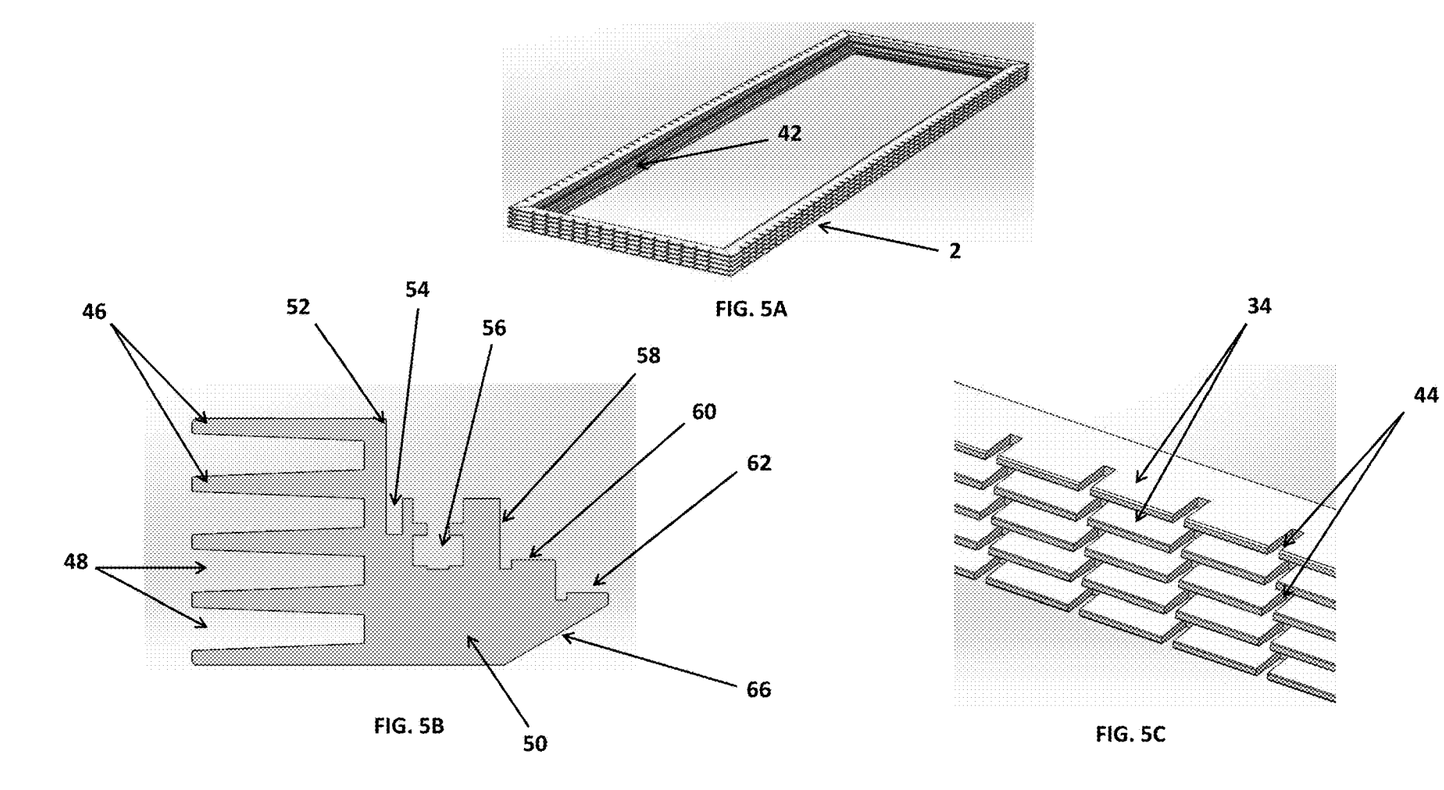
FIG. 5A shows top perspective view of one embodiment of the assembled frame of the light panel assembly of the present disclosure.
FIG. 5B shows a cross-section of one embodiment of a "picture frame" heatsink according to the principles of the present disclosure.
FIG. 5C shows a perspective view of one portion of the "picture frame" heatsink of one embodiment of the light panel assembly of the present disclosure.

Referring to FIG. 5A, a top perspective view of one embodiment of the assembled frame of the light panel assembly of the present disclosure is shown. More specifically, the sides of the frame are assembled together and can be connected via L-shaped "nut bars" that are inserted into the end of each extruded rail allowing each corner to be secured with screws. A plurality of layers each contain a plurality of fins distributed around the outside of the frame 2. After several thermal simulations were run the following features including; the number of fins, fin thickness and length, the addition of vertical "saw-cut" slots that would help convection, and the profile geometry of the extrusion were iteratively re-modeled to optimize the design in order to provide the greatest heat dissipation using the least amount of material to reduce the size and overall weight of the light panel assembly.

In one embodiment, a very conservative 100 W (of heat from the LED PCBs) was passively dissipated to the outside ambient air and result in an extrusion (rail) temperature (only) in the mid 60s ° C. range, which is warm but not too hot to touch and more importantly not approaching the 105° C. acrylic glass transition temperature which could start to melt the light guide and other layers within the light panel assembly. On the inside 42 of each of the sides of the frame are a series of spaced protrusions and recesses that accommodate the multiple layers that form the light panel assembly and provide for connection of the top cover (not shown). Some of these layers include, but are not limited to, a diffuser, a light guide, a foam gasket, a polyester laminate, a conversion film, and a rear backer.

Referring to FIG. 5B, a cross-section of one embodiment of an extruded "picture frame" heatsink according to the principles of the present disclosure is shown. More specifically, in one embodiment a pair of short frame rails and a pair of long frame rails are assembled together to form a rectangular light panel assembly. Each rail, where this is a representative cross section of a rail, is made of a unitary piece of material 50. A series of layers 46 are formed along the "outside" edge of the rail, such that the layers are spaced from each other by a series of recesses 48. In certain embodiments, the layers become thinner toward their free ends and may act as fins. In one embodiment, at a transition point 52 the recesses transition to being formed in an orientation essentially perpendicular to the layers 46. In one embodiment, a recess 56 is configured to accept a fastener used to secure the top cover to the rest of the light panel assembly. In one embodiment, all of these areas including 54 and 56 along with the fin profile, items 46 and 48, are integral to the aluminum extrusion. Item 56 is an internal area within the extrusion designed to act as a "nut" for the rear backer mounting screws. As a mounting screw enters the channel in the extrusion; the threads of the mounting screw engage and form threads within and against the short horizontal ribs within the channel 56. Item 54 is a pocket for the "return flange" of the Rear Backer Panel which may be filled with a bead of room temperature vulcanizing silicone (RTV), or the like, along the full perimeter to "seal" the rear backer panel to the extruded frame.

Still referring to FIG. 5B, in one embodiment a side wall 58 provides for mounting of one of the LED strips and the shelf 60 provides for mounting of a light guide. In some cases under the light guide on a second shelf 62 provides for mounting for a diffuser layer. In one embodiment a conversion film can rest on the top surface of the diffuser layer and can be inserted and removed between the light guide and diffuser layer. In one embodiment an angled surface 66 forms a beveled face surrounding a light emitting surface for the assembled light panel assembly. It is understood that variations to the cross section of the rail are possible while still providing for orientation and spacing for the multiple layers of the light panel assembly of the present disclosure. In some embodiments, post extrusion machining operations may further modify the cross-sectional profile of the rail.

Referring to FIG. 5C, a perspective view of one portion of the picture frame of one embodiment of the light panel assembly of the present disclosure is shown. More specifically, a plurality of fins 34 are provided by a series of recesses 44 spaced along each of the plurality of layers of the frame. In some cases, as shown here for example, the recesses are aligned in the vertical direction to allow heat to rise up through the fins.

Photosynthetically active radiation, often abbreviated PAR, designates the spectral range (wave band) of solar radiation from 400 to 700 nanometers that photosynthetic organisms are able to use in the process of photosynthesis. This spectral region corresponds more or less with the range of light visible to the human eye. In land plants, leaves absorb mostly red and blue light in the first layer of photosynthetic cells because of Chlorophyll absorbance.

One common measure of photosynthetically active radiation is photosynthetic photon flux (PPF). PPF values all photons from 400 to 700 nm equally. PAR as described with PPF (μmol/s) does not distinguish between different wavelengths between 400 and 700 nm, and assumes that wavelengths outside this range have zero photosynthetic action. If the exact spectrum of the light is known, the photosynthetic photon flux density (PPFD) values in μmol/s*m$^2$ can be modified by applying different weighting factors to different wavelengths. This results in a quantity called the yield photon flux (YPF).

In certain embodiments of the system of the present disclosure, the system does not use a filtering approach to get a different spectrum for use in plant growth, but rather uses phosphors. Filtering is a subtractive process which is inefficient and always leaves one with less light than one began with. In contrast, the phosphors are excited by blue LED light and then become an incident light source itself with a wider spectrum. The excited phosphors give off almost as much energy as they take in, which is why the system is both very efficient and adjustable to produce various spectra without further loss. Some conventional lights use different colored LEDs and allow the colors to mix creating a broader spectrum. This does allow for color changes. Only by reducing the amount of light from one color source or another, can the spectra be modified and like a filter that results in less overall light.

In one embodiment of the present disclosure, a 250 W input power system was tested both with and without a diffuser layer to collect data on operating temperature, output PPF, and the unit's light profile. In certain embodiments, the unit of the present disclosure comprises a potentiometer allowing users to adjust the light intensity for the unit. In these tests, the intensity was held constant amongst all testing. As shown in the tables below, a vertical column of light, radiating left and right was produced. The unit operating temperate was 25° C. The grid area test was 4 ft$^2$ and was divided into 6 in$^2$ blocks.

TABLE 1

| \multicolumn{8}{c}{Unit 6 inches above grid (diffuser layer present).} |
| 24 in | 18 in | 12 in | 6 in | 6 in | 12 in | 18 in | 24 in |
| --- | --- | --- | --- | --- | --- | --- | --- |
| 5 | 25 | 111 | 293 | 294 | 110 | 26 | 5 |
| 6 | 30 | 136 | 343 | 355 | 135 | 29 | 7 |
| 8 | 35 | 144 | 362 | 372 | 149 | 33 | 8 |
| 9 | 36 | 149 | 360 | 367 | 155 | 34 | 9 |
| 9 | 35 | 150 | 360 | 365 | 143 | 32 | 9 |
| 8 | 32 | 137 | 352 | 354 | 135 | 32 | 8 |
| 7 | 31 | 134 | 331 | 334 | 127 | 27 | 7 |
| 6 | 24 | 121 | 288 | 280 | 111 | 23 | 6 |

PPF (μmoles s$^{-1}$) measured inches from center of grid. The angle to the 24 inch spread was 127 degrees, and the angle to the 48 inch spread was 152 degrees. The maximum output measured at the diffuser layer was 625 PPF.

TABLE 2

| \multicolumn{8}{c}{Unit 12 inches above grid (diffuser layer present).} |
| 24 in | 18 in | 12 in | 6 in | 6 in | 12 in | 18 in | 24 in |
| --- | --- | --- | --- | --- | --- | --- | --- |
| 20 | 48 | 103 | 165 | 166 | 103 | 48 | 20 |
| 23 | 58 | 127 | 203 | 205 | 127 | 60 | 24 |
| 27 | 65 | 137 | 216 | 220 | 139 | 65 | 27 |
| 29 | 68 | 140 | 219 | 225 | 141 | 66 | 27 |
| 28 | 67 | 140 | 215 | 223 | 144 | 69 | 26 |
| 26 | 61 | 128 | 210 | 215 | 126 | 63 | 26 |
| 23 | 55 | 118 | 193 | 196 | 123 | 57 | 24 |
| 19 | 42 | 93 | 156 | 155 | 97 | 45 | 19 |

PPF measured inches from center of grid. The angle to the 24 inch spread was 90 degrees, and the angle to the 48 inch spread was 127 degrees.

TABLE 3

| \multicolumn{8}{c}{Unit 18 inches above grid (diffuser layer present).} |
| 24 in | 18 in | 12 in | 6 in | 6 in | 12 in | 18 in | 24 in |
| --- | --- | --- | --- | --- | --- | --- | --- |
| 29 | 50 | 80 | 105 | 105 | 81 | 51 | 29 |
| 35 | 61 | 97 | 129 | 130 | 97 | 61 | 33 |
| 40 | 69 | 108 | 140 | 142 | 107 | 68 | 37 |
| 40 | 69 | 109 | 144 | 146 | 112 | 70 | 40 |
| 39 | 70 | 110 | 143 | 145 | 112 | 70 | 40 |
| 37 | 64 | 107 | 136 | 139 | 106 | 67 | 37 |
| 33 | 57 | 93 | 123 | 125 | 95 | 60 | 33 |
| 27 | 47 | 74 | 98 | 99 | 77 | 49 | 27 |

PPF measured inches from center of grid. The angle to the 24 inch spread was 67 degrees, and the angle to the 48 inch spread was 106 degrees.

TABLE 4

| \multicolumn{8}{c}{Unit 24 inches above grid (diffuser layer present).} |
| 24 in | 18 in | 12 in | 6 in | 6 in | 12 in | 18 in | 24 in |
| --- | --- | --- | --- | --- | --- | --- | --- |
| 34 | 49 | 67 | 79 | 78 | 65 | 48 | 31 |
| 38 | 57 | 78 | 93 | 92 | 76 | 56 | 36 |
| 41 | 63 | 85 | 101 | 101 | 85 | 61 | 39 |
| 42 | 64 | 87 | 104 | 104 | 87 | 63 | 40 |
| 43 | 66 | 89 | 104 | 104 | 86 | 63 | 40 |
| 40 | 61 | 83 | 99 | 99 | 82 | 60 | 38 |
| 37 | 54 | 74 | 88 | 88 | 72 | 53 | 35 |
| 31 | 45 | 60 | 71 | 71 | 59 | 43 | 28 |

PPF measured inches from center of grid. The angle to the 24 inch spread was 53 degrees, and the angle to the 48 inch spread was 90 degrees.

TABLE 5

Unit 6 inches above grid (no diffuser layer present).

| 24 in | 18 in | 12 in | 6 in | 6 in | 12 in | 18 in | 24 in |
|---|---|---|---|---|---|---|---|
| 6 | 24 | 120 | 322 | 318 | 118 | 23 | 5 |
| 7 | 32 | 150 | 386 | 392 | 145 | 30 | 6 |
| 8 | 35 | 161 | 400 | 408 | 161 | 34 | 8 |
| 8 | 36 | 160 | 398 | 409 | 158 | 34 | 8 |
| 8 | 36 | 161 | 392 | 405 | 158 | 35 | 8 |
| 7 | 33 | 150 | 384 | 388 | 150 | 34 | 8 |
| 7 | 28 | 142 | 366 | 377 | 138 | 29 | 7 |
| 5 | 23 | 117 | 317 | 312 | 117 | 24 | 6 |

PPF measured inches from center of grid. The angle to the 24 inch spread was 127 degrees, and the angle to the 48 inch spread was 152 degrees. It is understood that a PPF over 120 is not useful in plant growth and thus is wasted output. The maximum output measured at the conversion layer was 750 PPF.

TABLE 6

Unit 12 inches above grid (no diffuser layer present).

| 24 in | 18 in | 12 in | 6 in | 6 in | 12 in | 18 in | 24 in |
|---|---|---|---|---|---|---|---|
| 20 | 47 | 105 | 174 | 170 | 103 | 48 | 19 |
| 24 | 61 | 134 | 219 | 220 | 136 | 63 | 24 |
| 29 | 71 | 148 | 237 | 236 | 149 | 69 | 28 |
| 30 | 73 | 153 | 243 | 245 | 153 | 69 | 30 |
| 30 | 72 | 154 | 241 | 242 | 151 | 69 | 30 |
| 27 | 68 | 143 | 234 | 233 | 144 | 68 | 27 |
| 25 | 62 | 132 | 215 | 219 | 134 | 60 | 25 |
| 20 | 48 | 105 | 172 | 178 | 107 | 50 | 21 |

PPF measured inches from center of grid. The angle to the 24 inch spread was 90 degrees, and the angle to the 48 inch spread was 127 degrees.

TABLE 7

Unit 18 inches above grid (no diffuser layer present).

| 24 in | 18 in | 12 in | 6 in | 6 in | 12 in | 18 in | 24 in |
|---|---|---|---|---|---|---|---|
| 32 | 55 | 88 | 114 | 114 | 86 | 55 | 31 |
| 38 | 67 | 107 | 141 | 140 | 105 | 65 | 37 |
| 42 | 76 | 119 | 154 | 155 | 118 | 74 | 42 |
| 45 | 79 | 123 | 159 | 160 | 122 | 79 | 44 |
| 44 | 75 | 120 | 157 | 159 | 123 | 79 | 44 |
| 40 | 72 | 115 | 151 | 153 | 117 | 73 | 40 |
| 36 | 65 | 103 | 136 | 138 | 106 | 67 | 37 |
| 30 | 51 | 82 | 110 | 111 | 85 | 53 | 31 |

PPF measured inches from center of grid. The angle to the 24 inch spread was 67 degrees, and the angle to the 48 inch spread was 106 degrees.

TABLE 8

Unit 24 inches above grid (no diffuser layer present).

| 24 in | 18 in | 12 in | 6 in | 6 in | 12 in | 18 in | 24 in |
|---|---|---|---|---|---|---|---|
| 35 | 53 | 71 | 84 | 83 | 70 | 52 | 34 |
| 42 | 62 | 84 | 99 | 99 | 82 | 60 | 38 |
| 45 | 68 | 91 | 109 | 109 | 92 | 68 | 43 |
| 48 | 71 | 95 | 114 | 113 | 96 | 70 | 44 |
| 47 | 70 | 95 | 112 | 112 | 93 | 68 | 44 |
| 44 | 66 | 90 | 107 | 108 | 89 | 64 | 42 |
| 40 | 60 | 81 | 95 | 96 | 80 | 58 | 38 |
| 33 | 49 | 65 | 78 | 78 | 65 | 49 | 32 |

PPF measured inches from center of grid. The angle to the 24 inch spread was 53 degrees, and the angle to the 48 inch spread was 90 degrees.

Because the PPF of the light unit is known along with the input wattage, the efficiency of the lighting system conversion of electrical energy into PAR can be calculated. As a reminder, the unit for PPF is μmol/s, and Watts is Joule per second (J/s), therefore, the seconds in the numerator and denominator cancel out, and the unit becomes μmol/J. The higher this number is, the more efficient a lighting system is at converting electrical energy into photons of PAR. In certain embodiments, the efficiency of the system ranges from about 250/104 (2.4) to 250/31 (8.1) J/μmol across a 4 ft² grid at a height of 24 inches.

TABLE 9

An exemplary conventional system. Area 4 ft² (24 in × 24 in), where CL is the center line and the measurements are taken a distance from the center line.

| Height from grid | CL | 6 in | 12 in | 18 in | 24 in |
|---|---|---|---|---|---|
| 6 in away | 788 | 700 | 220 | 30 | 4 |
| 12 in away | 425 | 365 | 210 | 100 | 15 |
| 18 in away | 245 | 225 | 180 | 85 | 32 |
| 24 in away | 160 | 154 | 130 | 80 | 40 |

The measured operating temperature for a conventional system was 50° C. in the presence of a box fan. The conventional unit input power was 180 W at a single point source at a single voltage, such that the one spectrum radiated light diminishes in all directions about 360°. The unit dimensions measured 576 in² in this embodiment.

One embodiment of the present disclosure had an input power that was 43% of competitive and had a heat generation profile that was 29% of competitive systems. Assuming light distribution (4 ft×8 ft) from a similarly constructed lamp is equal, then the competitive lamp requires 966 W compared 544 W (272 W×2) of the present system. Additionally, the competitive system generates a circular pattern of declining annular rings, while the present system generates a solid column of light, providing full coverage in the 4 ft direction, thus more light over a larger area of the work surface.

Figure 6A:
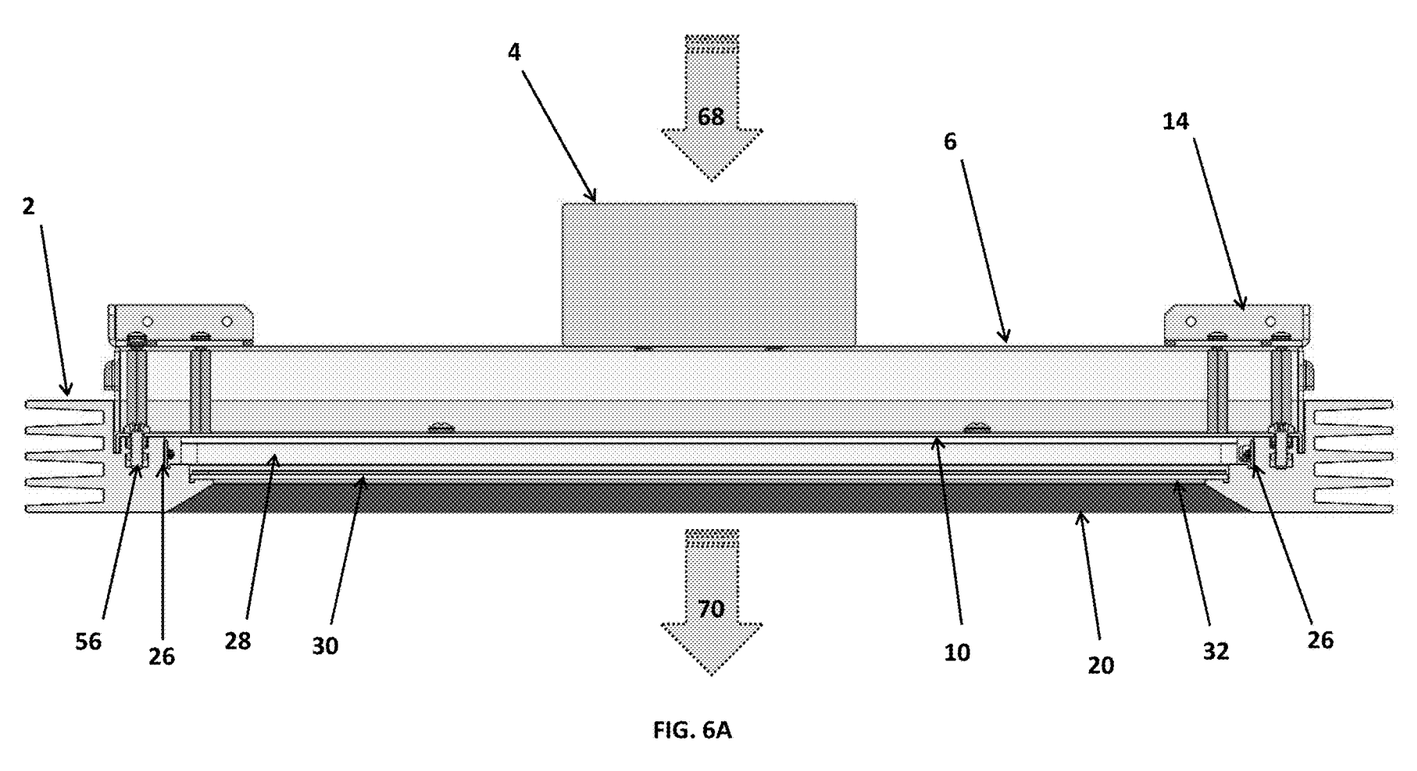
FIG. 6A shows a cross-section of one embodiment of the light panel assembly of the present disclosure.

Referring to FIG. 6A, a cross-section of one embodiment of the light panel assembly of the present disclosure is shown. More particularly, this view is across the short width of one embodiment at about the midpoint as the LED PCB modules power supply 4 is visible. In some cases, a single power supply serves a plurality of LEDs. In one embodiment, the extruded heatsink picture frame 2 has five layers that act as fins, as well as a series of segments (fins) along the length of each layer to further promote heat dissipation (See, e.g., FIG. 5C). Here, "L" brackets 14 are shown secured to the top cover 6 and the remainder of the light panel assembly using fasteners coupled with the frame, e.g., in recesses 56.

The light panel assembly of the present disclosure has an input electrical power and an output power in the form of illumination (PPF). In one example, the total input electrical power 68 is less than 400 W. More specifically, less than 275 W. In one embodiment, the output power is about 150 W to about 200 W of radiant flux. In one embodiment of the light panel assembly of the present disclosure, the LED efficiency per specification is about 1.4 W (radiant flux)/2.03 W for 69% efficiency. In some cases, the light guide efficiency is about 70% and the measured diffuser efficiency is about 85%. To calculate radiant flux, with 390 W input electrical power for example divided by 2.03 W per LED we use 192 LEDs total or about 24 LEDs per foot for each of eight PCB modules. For 24 LEDs×1.4 W radiant flux per LED×8 PCB modules=269 W radiant flux. Then, 269 W×0.7 (light guide efficiency)×0.85 (diffuser efficiency) the result is about 160 W output radiant flux.

In another embodiment, the input electrical power 68 is about 272 W and the output radiant flux 70 is about 114 W. There, the LED efficiency per specification is about 1.4 W (radiant flux)/2.0 W for 69% efficiency. In some cases, the light guide efficiency is about 70% and the measured diffuser efficiency is about 85%. To calculate radiation flux, with 272 W input electrical power for example divided by 2.0 W per LED=136 LEDs total or about 34 LEDs per foot for each of the four PCB modules. For 34 LEDs×1.4 W radiant flux per LED×4 PCB modules=190.4 W radiant flux. Then, 190.4 W×0.70 (light guide efficiency)×0.85 (diffuser efficiency) the result is about 114 W output radiant flux.

Still referring to FIG. 6A, in this embodiment, the power supply 4 and associated junction boxes are mounted to the top cover 6. Below the backer plate and running along the length of the frame 2 are strips of LEDs 26 abutting a light guide 28 for use in dispersing illumination from the LED strips. Below the light guide is a removable light conversion layer 30 and some distance away, there is a diffuser layer 32. When assembled, the light panel assembly has a luminous area 20 that is beveled in some cases. While the beveled profile may be an aesthetic feature to smooth out the "squareness" of the extrusion profile, it may also help direct the light outward at an angle.

A conventional system was tested and had 340 W input electrical power and the output radiant flux was about 115 W. There, the LED efficiency per specification was about 0.116 W (radiant flux)/0.29 W for 40% efficiency. In some cases, the light guide efficiency was about 70% and the measured diffuser efficiency was about 85%. To calculate radiation flux, with 340 W input electrical power for example divided by 0.29 W per LED=1667 LEDs total. For 1667 LEDs×0.116 W radiant flux per LED×0.40 LED efficiency=193.3 W radiant flux. Then, 193.3 W×0.70 (light guide efficiency)×0.85 (diffuser efficiency) the result is about 115 W output radiant flux for a system using more than 20% more input electrical power.

Figure 6B:
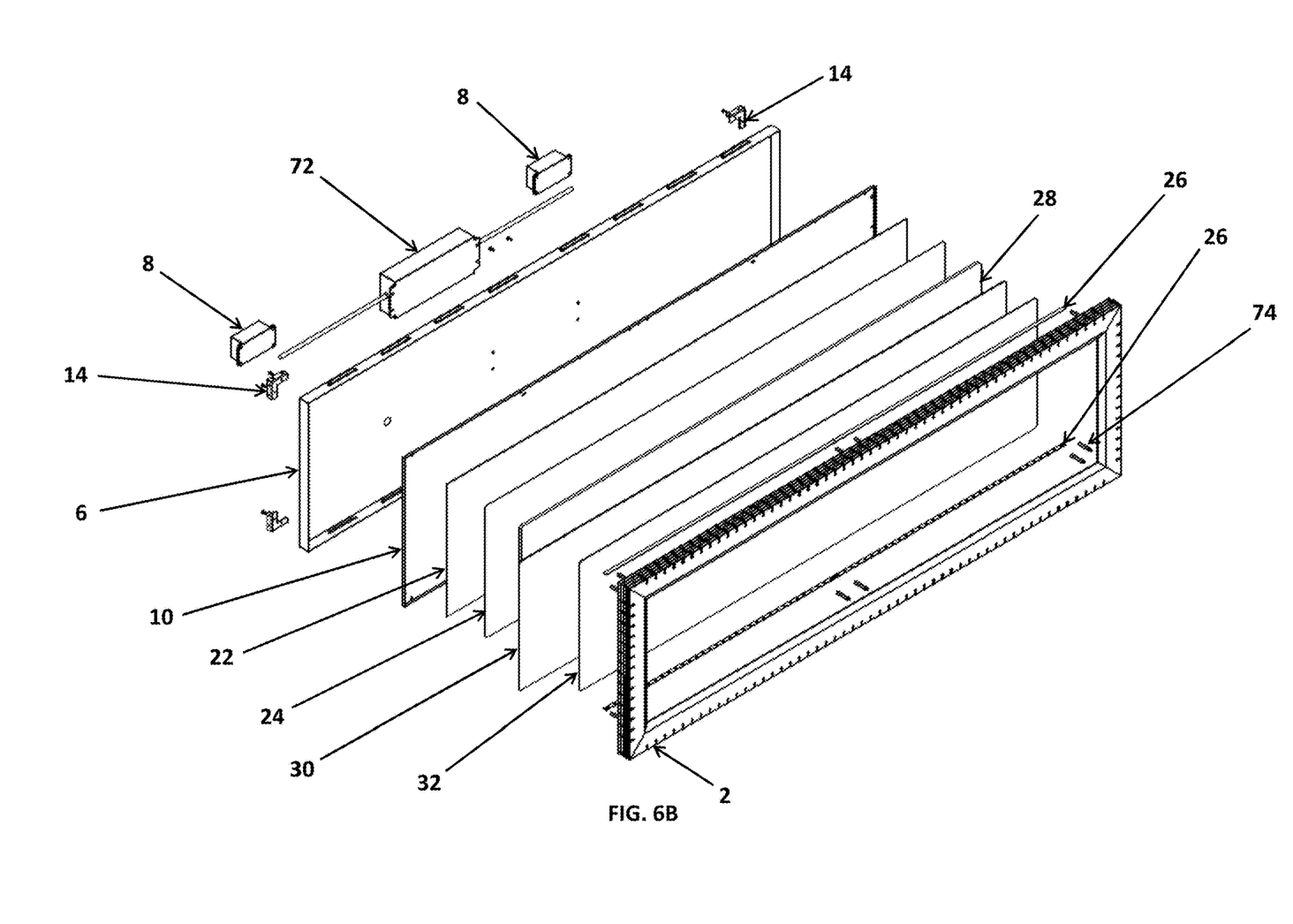
FIG. 6B shows an exploded view of one embodiment of the light panel assembly of the present disclosure.

Referring to FIG. 6B, an exploded view of one embodiment of the light panel assembly of the present disclosure is shown. More particularly, from the bottom of a unit (where light is emitted) there is a frame 2 and the frame is connected to some set-offs 74 that provide proper alignment and position for the plurality of LED strips 26 to coincide with the light guide layer. The next layer, in this embodiment, is a diffuser layer 32. Proceeding in the same direction, the next layer (spaced some distance away according to the dimension of the extruded heat sink frame) is a removable light conversion film layer 30. A light guide layer 28 is positioned to disperse the light emitted from the LEDs. A laminate layer 24 is laminated to the rear surface of the light guide and sandwiched between the light guide layer and gasket spacer 22. A backer plate 10 is secured to the frame with screws and RTV sealant to form a water protective seal. In this embodiment the "top most" layer is a top cover 6 which the power supply 72 and junction boxes 8 are mounted. The top cover comprising of sides and optional vents is secured to the multiple layers and the frame assembly to form the light panel assembled using "L" brackets 14, or other fasteners. The following paragraphs lay out certain embodiments of the various layers present in the light panel assembly of the present disclosure.

In one embodiment, the top cover is made of a sheet of 1.3 mm thick aluminum. It is fabricated (punched and formed) in to the desired shape. In one example, the end size is about 14.4"×52.8" with a clear anodized finish applied to all surfaces. The clear anodized finish gives a clean cosmetic view. One embodiment of the backer plate is made of a sheet of 1.2 mm thick aluminum. It is fabricated (punched and formed) in to the desired shape. In one example, the end size is about 14.4"×52.8" with a clear anodized finish applied to all surfaces. The clear anodized finish gives a clean cosmetic view. In one embodiment, aluminum was chosen because it is strong and light. It is also easy to machine/manufacture these parts using aluminum. Steel could be used in place of aluminum, but it would add weight. The thicknesses were chosen based off industry standard thicknesses for aluminum. They are thick enough to hold shape and be strong and rigid for the assembly. The primary heat exchanger for this design is through the aluminum frame but the backer and top cover may also help to dissipate heat as they will be in contact with the frame. Aluminum also is very resistant to corrosion from exposure to water, which is helpful in horticultural applications.

One embodiment of the gasket spacer is about 2.0 mm to about 2.5 mm thick closed cell foam, or equivalent. In one example, the foam is cut from a roll (51.4"×12.8"). In some cases, the material is not critical as long as it is similar to closed cell foam. The density would need to be about the same as closed cell foam because in certain embodiments there is a need for it to compress. The gasket spacer is used to 'sandwich' the light guide/laminate between the frame ridge (62) and the backer. This is to help keep the light guide in one place and not move around during transportation or initial light setup. In some cases, while minimal heat absorption from the gasket spacer is seen, it may still aid in drawing heat away from the light guide and up through the backer.

In one embodiment, the laminate layer is about 0.2 mm thick, white polyester cut to size (e.g., 51.4"×12.8"). In one example, the laminate layer is cut from a roll of polyester with the desired thickness. In one embodiment, polyester was chosen as it is easy to laminate to the light guide. The polyester's color (e.g., white) is also used as a reflector to direct the light down through the light guide. The thickness chosen is an industry standard thickness and there is interest in not adding thickness to the overall assembly by making it much thicker.

In certain embodiments the light guide is about 0.25" thick acrylic cut to size (e.g., 51.4"×12.8"). In one embodiment, the top surface of the light guide is laser etched or screen printed with a circular pattern to help spread the light within the acrylic and also direct light downward toward the illuminated area. The 0.25" vertical edges of the light guide will be polished to allow light to easily transfer into the interior. The two short side edges can be capped with white or silver tape to help keep light within the light guide. The laser etch/screen print pattern is currently setup as an array of 0.050" diameter circles with a 0.060" spacing between them. This is used to help reflect and spread the light across the light guide. The laser etch pattern is also optimized to help control light emittance through the diffuser. The etch pattern may be adjusted to find the most optimal pattern for even spreading of light. The thickness was chosen at 0.25" because it matches that of the LED PCBs and provides for the centering of the LEDs along the horizontal axis of the light guide. The material was chosen as acrylic as it is a common industry standard but could also be substituted with polycarbonate of the same size and thickness. The polycarbonate can be laser etched/screen printed in the same manner as the acrylic.

In one embodiment of the light assembly of the present disclosure, the light guide thickness is based on the LEDs alignment to the light guide. In one embodiment, the design uses a single row of LEDs thus the light guide thickness is based on capturing that light and drawing it into the light guide. A thinner light guide would not catch the light and a thicker light guide would be less efficient in carrying the light across the lamp surface. Competitive lamps may use a double stack of LEDs, which would require the light guide to be +50% or greater in thickness to absorb the light energy.

In one embodiment of the light panel assembly of the present disclosure, the conversion film is about a 0.2 mm thick sheet of material that is able to covert the 450 nm blue light from the LEDs to a variety of different colors suitable for the growth cycle of plants. There are multiple sources of conversion film that are able to perform this function. The conversion film is often roll laminated to 1 mm to 2 mm thick sheet of acrylic to be able to make it rigid and handled (installed/assembled). In one embodiment, the sheet is about 51.2"×12.5". In certain embodiments, the conversion film is not "glued" to the acrylic but will adhere on contact (e.g., using static forces, or the like). In another embodiment, the conversion film is roll laminated directly to the back of the diffuser (face that is closest to the light guide) and inserted in the same manner as described herein. In certain embodiments, the conversion film is not laminated to the light guide in any way.

In certain embodiments, white LEDs are used. In some cases, white LEDs are blue LEDs with a yellow phosphor coating in the emitter to shift the radiated color. Blue is used because the radiated power efficiency is high and blue through ultraviolet are very effective at exciting the phosphors. The conversion film is a film coated with an appropriate phosphor, which when combined with the blue emission from the LED produces a white light. Various different phosphors will create various color temperature white light, such as 4000 degree Kelvin, which is similar to mid-day sunlight (blueish), or 2000-3000 degree Kelvin which more closely emulates artificial lighting (yellowish). By using blue LEDs one can vary the color of the output light using conversion films that are not constrained to whatever phosphor was used in the LED manufacture. The phosphor maintains about 85% of the energy in the blue light. The conversion film will change the 450 nm blue light wavelength to other wavelengths of our choosing. Different stages of growth for plants like different wavelengths of light. In certain embodiments, the conversion film is used to make the light suitable for any plant and for any stage of the plant's life, thus making the entire growing operation more efficient. The conversion film doesn't drastically reduce the efficiency of the light like color change filters, or other methods. Other lights may have their wavelength set at a specific range for a plant's growth cycle but that is it. In that design, the plants would need to be moved around to be exposed to other lights that might have the next plant stage's wavelength. Also, the efficiency of the LED used herein is very high compared to standard LEDs.

In one embodiment, the diffuser is a 0.056" thick polycarbonate measuring (about 51.2"×12.6"), ideally having a frosted finish on both sides to better diffuse the light. In certain embodiments, the conversion film rests on top of the diffuser but is not adhered to the top surface of the diffuser. In other embodiments, the conversion film is adhered to the inside surface of the diffuser. A thicker diffuser will offer a more even light at the expense of some radiant flux. Thickness and surface preparation are a compromise between looks and efficiency. Diffusers are typically polycarbonate, acrylic, or ground glass. Polycarbonate is typically considered unbreakable, though it does scratch easily. Acrylic has better light transmissive properties, but is difficult to cut and drill without breaking. Glass is heavy and fragile. Polycarbonate was chosen in one embodiment as it is more common in the industry for diffusers. Frosted acrylic may also be used in place but it is unlikely to provide better results and cost more than frosted polycarbonate.

The aluminum extruded heat sink frame in one embodiment is an assembly made from two long extruded rails and two short extruded rails with a stamped L-shaped nut bar corner bracket at each corner for connecting the rails to each other. In one embodiment, the assembled frame measures about 1.3" thick×54.9" long×16.5" wide. The picture frame is a key structural element within the light panel assembly which supports the other layers while also acting as a heat sink to dissipate the heat from the LED PCBs to the outside air. In one embodiment, the frame is 100% aluminum as it has good heat transfer properties while being the most economical material to use. Aluminum alloys may be possible to use but it would increase the cost to manufacture and the overall unit assembly price. The aluminum rails/frame may also be clear anodized on all surfaces to give a clean cosmetic finish. The clear anodize will help to radiate heat away from the assembly during operation.

Referring to FIG. 7A, one embodiment of the system with two light panel assemblies assembled together for a particular application is shown. More specifically, in one application, two light panel assemblies 80 are spaced apart a distance (e.g., here it is shown as 43.5 inches from center of panel one to center of panel two) to provide efficient heat dissipation. The two light panel assemblies are secured in a frame 84 supported some distance below a ceiling, for example, using posts 86. In one embodiment, the frame and the posts each comprise L channel. In some embodiments, the number of assemblies and the spacing between them are set for a particular end use. In this embodiment a four foot by eight foot grid of light is produced and is shown diagrammatically, but not to scale. One embodiment of a grid is shown in more detail in FIG. 7B.

Figure 7B:
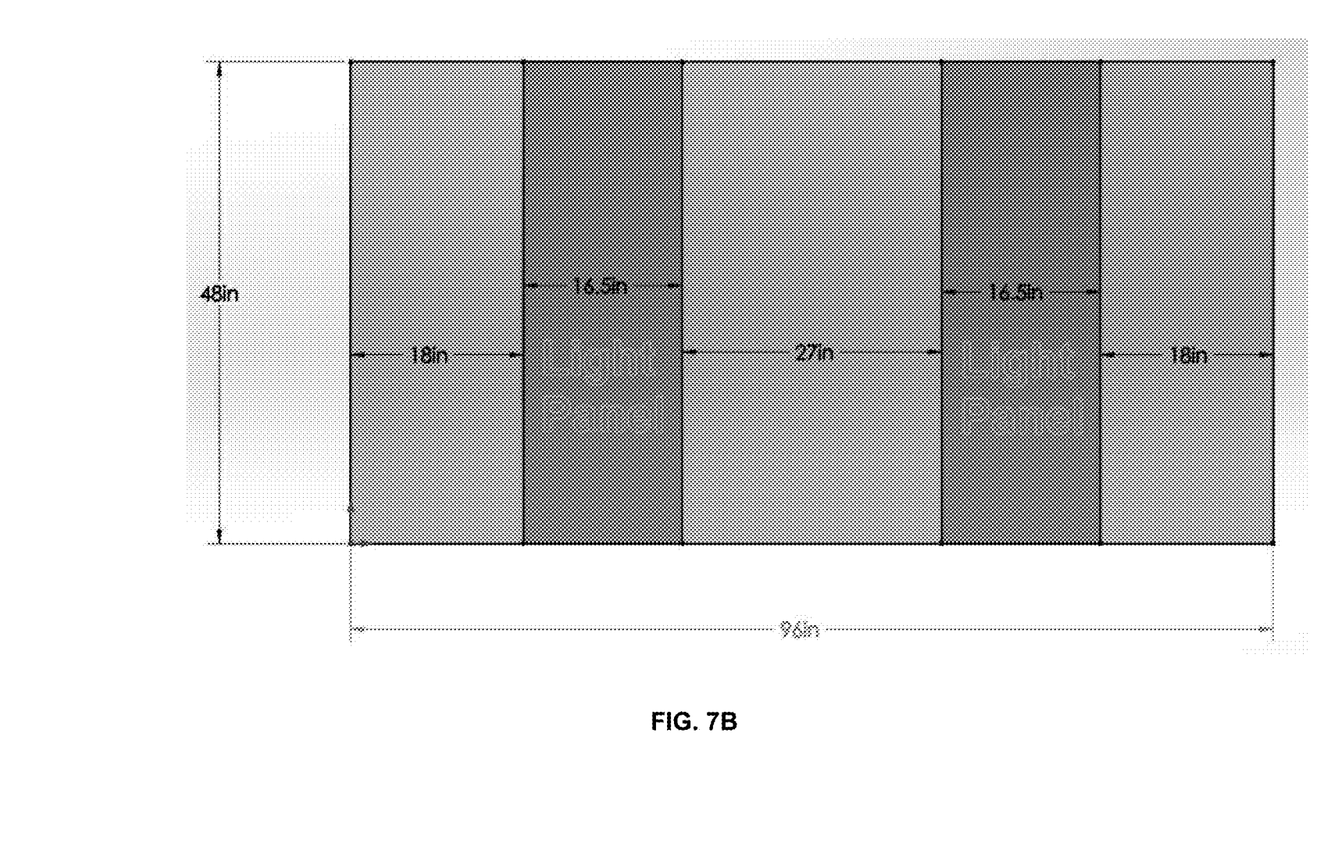
FIG. 7B shows one embodiment of a spacing arrangement for two light panel assemblies according to the principles of the present disclosure

Referring to FIG. 7B, one embodiment of a spacing arrangement for two light panel assemblies according to the principles of the present disclosure is shown. There, the coverage for the light panels results in a 4 foot by eight foot grid of light coverage for growing plants.

Table 10: Measurements for a two light panel assembly system is shown. There, PPF for each 6 inch square section of the gird is shown. The distance to the ground is 18 inches, the angle to 42 inch spread is 67 degrees and the angle to 48 inch spread is 106 degrees. A diffuser was used in these examples. Table 10A shows the measurements to the left of the center line of the grid and Table 10B shows the measurements to the right of the center line of the grid.

TABLE 10A

| Measurements left of the center line of the grid | | | | | | | |
|---|---|---|---|---|---|---|---|
| 48 in | 42 in | 36 in | 30 in | 24 in | 18 in | 12 in | 6 in |
| 26 | 44 | 76 | 106 | 115 | 99 | 74 | 61 |
| 30 | 53 | 89 | 127 | 140 | 120 | 89 | 71 |
| 33 | 58 | 100 | 141 | 154 | 131 | 96 | 78 |
| 35 | 61 | 106 | 147 | 162 | 135 | 102 | 81 |
| 35 | 63 | 105 | 148 | 163 | 137 | 101 | 82 |

TABLE 10A-continued

Measurements left of the center line of the grid

| 48 in | 42 in | 36 in | 30 in | 24 in | 18 in | 12 in | 6 in |
|---|---|---|---|---|---|---|---|
| 34 | 60 | 100 | 144 | 157 | 134 | 96 | 76 |
| 30 | 53 | 89 | 130 | 141 | 123 | 87 | 69 |
| 26 | 44 | 74 | 102 | 114 | 99 | 71 | 59 |

TABLE 10B

Measurements right of the center line of the grid

| 48 in | 42 in | 36 in | 30 in | 24 in | 18 in | 12 in | 6 in |
|---|---|---|---|---|---|---|---|
| 63 | 81 | 106 | 123 | 106 | 73 | 44 | 25 |
| 75 | 101 | 133 | 151 | 131 | 90 | 52 | 28 |
| 83 | 111 | 147 | 164 | 144 | 100 | 58 | 31 |
| 86 | 114 | 151 | 169 | 148 | 104 | 62 | 33 |
| 85 | 115 | 151 | 170 | 149 | 103 | 62 | 33 |
| 81 | 109 | 144 | 163 | 145 | 100 | 60 | 30 |
| 72 | 96 | 129 | 147 | 130 | 89 | 52 | 27 |
| 60 | 76 | 100 | 119 | 103 | 71 | 43 | 24 |

In certain embodiments, heat dissipation is accomplished by passive convection and can be linked to any figures that show the fin profile of the extrusion which acts as a large heat sink. The heat sink fin profile exists on all the rails including the short rails which do not receive the heat generated from the LED PCBs directly as the LEDs are only mounted to the long (side) rails in certain embodiments. There, the short rail extrusions/heat sinks serve to provide additional indirect cooling. In certain embodiments, the range of heat to be dissipated is less than 100 W (e.g., 136 LEDs×0.65 W=88.4 W), where the power input is approximately 300 W and the desired Radiant Flux power output is over 100 W. The output can be measured in W for Radiant Flux Output, LUX (Lumens per sq. m.) and others.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A light panel assembly, comprising:
an extruded rectangular frame comprising a first pair of rails and a second pair of rails, the first pair of rails being oriented along a long side of the rectangular frame and the second pair of rails being oriented along a short side of the rectangular frame, each of the rails comprising five or more protruding layers, or fins, each protruding layer having a plurality of cuts arranged along each of the five or more protruding layers to dissipate heat produced during operation of the light panel assembly;
a top cover configured to accept at least one power source and also provide a dust barrier;
a rear back layer configured to provide a barrier from water ingress;
a light guide layer configured to disperse radiation emitted by a plurality of light sources;
a light conversion film layer configured to receive incident radiation from the plurality of light sources in a first wavelength range and convert the incident radiation to an output radiation at a second wavelength range; and
a diffuser layer configured to diffuse the output radiation;
wherein the plurality of light sources are arranged along the length of at least one pair of rails and the light conversion film layer is removable from the light panel assembly after installation via a channel machined in at least one of the second pair of rails;
the light panel assembly producing an average photosynthetic photon flux (PPF) of about 80-100 µmoles/s at an installed height of about 18 inches across an area of about four feet by about four feet and passively dissipating at least 100 W of heat providing for an ambient temperature of the light panel assembly during operation of less than 60° C.

2. The light panel assembly according to claim 1, wherein the extruded frame comprises aluminum.

3. The light panel assembly according to claim 1, the extruded frame further comprising recesses for accepting fasteners for light panel assembly.

4. The light panel assembly according to claim 1, the extruded frame further comprising contours at particular spacing and having particular dimensions to accommodate each of the layers in the light panel assembly.

5. The light panel assembly according to claim 1, wherein the plurality of light sources are LEDs in a first wavelength range of about 450 nm and the light conversion layer converts to the second wavelength range of about 600 nm to about 700 nm.

6. The light panel assembly according to claim 1, wherein the light conversion film is laminated to the diffuser layer.

7. The light panel assembly according to claim 1, wherein the light conversion film is laminated to an acrylic layer other than the light guide.

8. The light panel assembly according to claim 1, further comprising a foam gasket layer and a polyester layer.

9. The light panel assembly according to claim 1, being installed in a growing area at a spacing to create a grid of about four feet by about eight feet.

10. The light panel assembly according to claim 1, wherein an output Flux of more than 100 W is produced using less than 300 W of input power.

11. A light panel assembly, comprising:
- an extruded rectangular frame comprising a first pair of rails and a second pair of rails, the first pair of rails being oriented along a long side of the rectangular frame and the second pair of rails being oriented along a short side of the rectangular frame, each of the rails comprising five or more protruding layers, or fins, each protruding layer having a plurality of cuts arranged along each of the five or more protruding layers to dissipate heat produced during operation of the light panel assembly;
- a top cover configured to accept at least one power source and also provide a dust barrier;
- a rear back layer configured to provide a barrier from water ingress;
- a light guide layer configured to disperse radiation emitted by a plurality of light sources;
- a light conversion film layer configured to receive incident radiation from the plurality of light sources in a first wavelength range and convert the incident radiation to an output radiation at a second wavelength range; and
- a diffuser layer configured to diffuse the output radiation;
- wherein the plurality of light sources are arranged along the length of at least one pair of rails and the light conversion film layer is removable from the light panel assembly after installation via a channel machined in at least one of the second pair of rails;
- the light panel assembly passively dissipating at least 100 W of heat providing for an ambient temperature of the light panel assembly during operation of less than 60° C. while producing an output Flux of more than 100 W using less than 300 W of input power.

12. The light panel assembly according to claim 11, wherein the extruded frame comprises aluminum.

13. The light panel assembly according to claim 11, wherein the plurality of light sources are LEDs in a first wavelength range of about 450 nm and the light conversion layer converts to the second wavelength range of about 600 nm to about 700 nm.

14. The light panel assembly according to claim 11, wherein the light conversion film is laminated to the diffuser layer.

15. The light panel assembly according to claim 11, wherein the light conversion film is laminated to an acrylic layer other than the light guide.

* * * * *